(12) United States Patent
Snodgrass et al.

(10) Patent No.: US 10,164,787 B1
(45) Date of Patent: Dec. 25, 2018

(54) PRINT TO EBOOK READER

(75) Inventors: Ryan J. Snodgrass, Kirkland, WA (US); Palanidaran Chidambaram, Chennai (IN); John Smiley, Preston, WA (US); Manikandan Thangarathnam, Chennai (IN); Hao Hu, Belmont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 936 days.

(21) Appl. No.: 12/956,839

(22) Filed: Nov. 30, 2010

(51) Int. Cl.
*G06F 13/00* (2006.01)
*H04L 12/28* (2006.01)
*H04L 29/06* (2006.01)

(52) U.S. Cl.
CPC ...... *H04L 12/2812* (2013.01); *H04L 65/4084* (2013.01)

(58) Field of Classification Search
USPC .................. 709/219, 220; 358/1.15; 345/660
See application file for complete search history.

(56) References Cited

U.S. PATENT DOCUMENTS

| | | | | |
|---|---|---|---|---|
| 7,024,466 | B2 * | 4/2006 | Outten et al. | 709/219 |
| 7,426,549 | B2 * | 9/2008 | Simpson et al. | 709/220 |
| 8,046,435 | B1 * | 10/2011 | Parekh et al. | 709/219 |
| 2005/0138648 | A1 * | 6/2005 | Ahmed | G06F 9/54 719/328 |
| 2006/0221380 | A1 * | 10/2006 | Pretz et al. | 358/1.15 |
| 2008/0208963 | A1 * | 8/2008 | Eyal et al. | 709/203 |
| 2010/0188690 | A1 * | 7/2010 | Moriya | G06F 3/1205 358/1.15 |
| 2010/0284036 | A1 * | 11/2010 | Ahn et al. | 358/1.15 |
| 2011/0102467 | A1 * | 5/2011 | Kudo et al. | 345/660 |

* cited by examiner

*Primary Examiner* — Kevin C. Harper
*Assistant Examiner* — Derrick V Rose
(74) *Attorney, Agent, or Firm* — Lee & Hayes, PLLC

(57) ABSTRACT

Techniques for transferring printable content from a remote device to an eBook reader include exposing a network printer interface that represents the eBook reader as a physical network printer. The remote device can be configured with a printer driver corresponding to the network printer interface, and a user may print documents from the remote device in order to transfer them to the eBook reader.

19 Claims, 12 Drawing Sheets

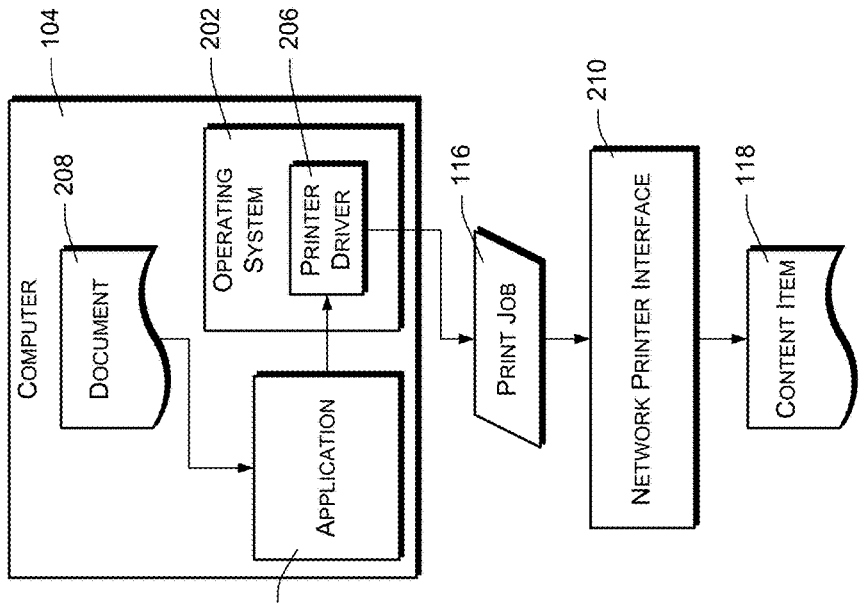
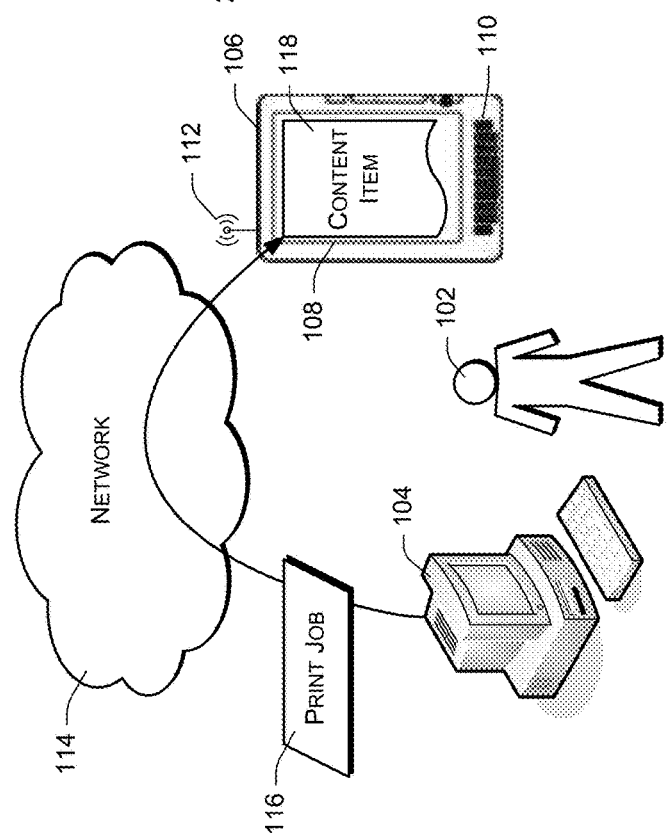

PRINT TO EBOOK READER

BACKGROUND

Users increasingly access and read electronic books ("eBooks") using a wide variety of eBook readers, including dedicated reader devices and specialized applications or functionality installed on other devices such as smartphones, personal digital assistants (PDAs), portable media players, desktop computers, portable computers, tablet computers, and so forth. These devices often have network connectivity, either wired or wireless, allowing them to remotely access and retrieve electronic content from online sources such as electronic book sellers and websites. Content items corresponding to written physical media, such as books and magazines, are available in this manner for consumption by users of eBook readers.

In addition to viewing published content items, users would often like to use their eBook readers for reviewing other types of materials. For example, users might create or receive documents on their computers, and may wish to peruse such documents using their eBook readers. In some cases, this can be done by first converting the documents to an eBook-compatible format, and then copying the converted documents to an eBook reader. Converted documents can be copied by connecting the eBook reader to a computer and using computer-specific commands to transfer the documents from the computer to the eBook reader. In addition, some systems allow a user to email an appropriately formatted document to a special email address hosted by a server, to be subsequently downloaded from the server to the user's eBook reader. Although this allows users to view their own documents on their eBook readers, it can be a time-consuming process.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 1 is a diagram illustrating how content can be transferred to an eBook reader by printing from a computer.

FIG. 2 is a block diagram illustrating the use of a printer driver in a computer to transfer content to an eBook reader.

DETAILED DESCRIPTION

Figure 3:
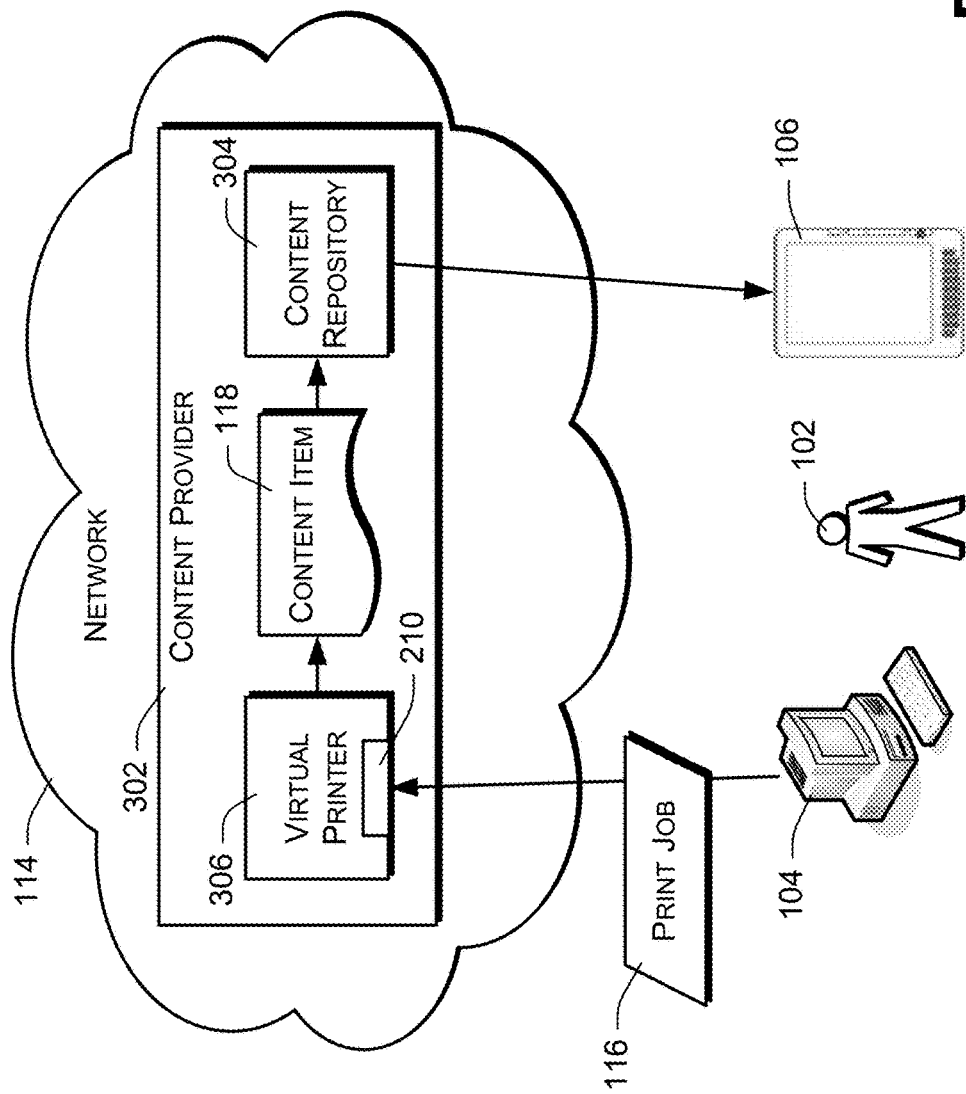
FIG. 3 is a diagram illustrating a web-based service that allows a user to transfer content from a computer to an eBook reader by printing.

The techniques described herein allow a user to easily transfer many types of content to an electronic book ("eBook") reader. These techniques utilize a virtual printer or network printer interface that is configured to receive print jobs from various network-connected remote devices such as personal computers. The virtual printer or network printer interface is associated with one or more eBook readers. After receiving a print job, the network printer interface makes the print job available as a content item to the associated eBook readers. The content item can then be displayed and viewed on the eBook readers as a normal content item.

FIG. 1 illustrates these techniques in the form of a block diagram. In this example, a user 102 is associated with a computer 104 and a eBook reader 106. For purposes of discussion, it is assumed that the computer 104 has various local applications that are used for creating and viewing content such as textual documents, drawings, pictures, graphics, and so forth. In addition, it is assumed that examples of such content are stored on the computer 104 and/or accessible to the computer 104. It is also assumed that the computer 104 has an operating system that supports network printer functionality, and that applications installed on the computer 104 can utilize the printer functionality provided by the computer operating system.

The eBook reader 106 can in some embodiments be a device dedicated to and specifically configured for rendering eBooks. Although FIG. 1 illustrates such a dedicated-purpose eBook reader device 106, other implementations may employ other types of electronic readers and devices, such as cellular phones, personal digital assistants, personal music players, tablet computers, desktop/laptop computers, etc., having resources or functionality for rendering eBooks and other visual-based electronic content items.

In this example, the eBook reader 106 is a handheld, portable device having a flat-panel display 108 upon which eBooks can be displayed. The display 108 may be implemented with touch-sensitive technology that is responsive to user input registered via, for example, a finger, a stylus, or other similar pointing device. The display 108 may comprise any sort of display technology including a passive display (e.g., an electrophoretic display, etc.), an active display (e.g., a liquid crystal display (LCD), a light-emitting diode (LED) display, etc.), and/or the like. The eBook reader 106 may also include a keyboard 110 or other types of actuatable elements that may have dedicated or assignable operations. For instance, the eBook reader 106 may have a power on/off button, selection keys, joystick, touchpad, and so forth.

The touch-screen display 108 presents content in a human-readable format to the user 102. The touch-screen display 108 may depict, for example, text of the eBooks, along with illustrations, tables, or graphic elements that might be contained in the eBooks. In some cases, the eBooks may include multimedia components, such as video or audio. In such scenarios, the display 108 (or an additional display) may also be configured to present video, and the eBook reader 106 may be equipped with audio output components to play audio files.

In the particular embodiment illustrated by FIG. 1, the eBook reader 106 has a wireless communications receiver or transceiver 112 configured to communicate wirelessly through a network 114. The wireless communications receiver or transceiver 112 can be a wireless local-area or wide-area network receiver, transceiver, or port, configured to communicate through a local-area or wide-area network using conventional IP (Internet Protocol) and IP-related protocols for wireless network communications. Alternatively, the wireless communications receiver or transceiver 112 might be a cellular-based communications component or device such as used in mobile telephones or other personal communications devices.

In order to transfer any particular content to the eBook reader 106, the user can open the content in an appropriate application on the computer 104. For example, the user may open a textual document using a text editing or word processing application. Once the content is open, the user may then print the content using commands within the application. For example, the user may select a "print" icon or menu item, instructing the application to print the open content. Assuming the computer 104 is appropriately configured, it will then send a print job 116 over the network 114 to the eBook reader 106, via a network printer interface associated with the eBook reader 106. When the print job is received, it is saved and/or delivered in a format that is compatible with the eBook reader 106, so that it can be subsequently displayed on the eBook reader 106 as a content item 118.

The network printer interface may be implemented by the eBook reader 106 itself, or on another system or device that can communicate with the eBook reader 106. The network 114 can be a public or private network, using wired and/or wireless technologies. In some embodiments, the network 114 may comprise the public Internet. In other embodiments, the network 114 may be a local network that is connected for communications with the Internet. In still other embodiments, the network 114 might comprise several networks, such as the Internet and one or more private or proprietary networks that provide communications between a content provider and a plurality of eBook readers.

FIG. 2 shows this process in more detail. In this example, the computer 104 has an operating system 202 and an application 204. The application 204 interacts with the operating system 202 for various purposes, including for printing documents. The operating system 202 has one or more printer drivers 206 that can be utilized by programs such as the application 204 to print content.

The application 204 can be any program, routine, or functional component that is able to print through the printer driver 206. Examples of such applications include text and graphics editors, word processors, drawing editors, photo editing programs, browsers, and many other types of programs, including components of the operating system 202.

In some cases, the application 204 may be used to open and/or manipulate a local document 208. The document 208 may be a text file, a word processing file, a graphics file, a picture, drawing, or any other type of data object upon which a printable image may be based. In certain cases, the application 204 may generate a printable image without accessing or opening a stored document. Also, in some cases the document 208 may be stored remotely, and accessible using a network or other communication techniques.

The printer driver 206 is configured to access a virtual printer or network printer interface 210 as its destination. Modern operating systems such as the operating system 202 allow computer users to specify printers that are accessible through local-area or wide-area networks. In some cases, for example, the user specifies a numeric network address or URL (uniform resource locator) to identify such a printer. The network printer interface 210 appears on the network 114 as a conventional network-accessible printer, which might in other situations be part of a physical printer. In this case, however, the network printer interface 210 is not associated with a physical printer. Rather, it accepts the print job 116 and, rather than printing the print job, the network printer interface 210 generates or provides the content item 118 that can be viewed on the eBook reader 106.

In some implementations, the network printer interface 210 may be implemented as part of a web service or content provider. In other cases, it might be implemented as part of the eBook reader 106. These different implementations will be explained below.

FIG. 3 shows an implementation in which the network printer interface 210 is implemented as part of a web service, which in this example comprises a content provider or service 302. In some implementations, the content provider 302 may comprise an Internet-based eBook provider or service. The eBook reader 106 may be associated with the content provider 302, from which the user 102 may obtain eBooks and other content. The content provider 302 may maintain an account for the user 102, and the eBook reader 106 may be registered or identified as belonging to the user's account. The content provider 302 may track purchases, downloads, billing information, and other activities of the user 102 with respect to the eBook reader 106. In addition, the eBook reader 106 may periodically communicate through the network 114 with the content provider 302 to download content such as eBooks and other items. In some cases, the eBook reader 106 may also be used to browse and purchase content that is available from the content provider 302.

In this example, the content provider 302 maintains a content repository 304, which contains or references content items that the user 102 has purchased or that are otherwise available to the user 102. Depending on the configuration, the eBook reader 106 may automatically download all content items identified by content repository 304, or may download only particular content items that have been designated by the user 102.

In the implementation of FIG. 3, the content provider 302 also implements a virtual printer 306 that is associated with the user 102. The virtual printer 306 exposes the network printer interface 210, which is accessible to remote devices such as the computer 104. The network printer interface 210 communicates using conventional network printer communications protocols to receive the print job 116 from the computer 104, via the network 114.

Upon receiving the print job 116, the virtual printer 306 produces content item 118 based on the received print job, formatted as a normal content item that can be stored by the content provider 302 and rendered by the eBook reader 106. The content item 118 can then be delivered to the eBook reader 106 via the network 114. In some embodiments, the content item 118 may be added to or stored in the user's content repository 304, from which it can be subsequently downloaded by the eBook reader 106.

Figure 4:
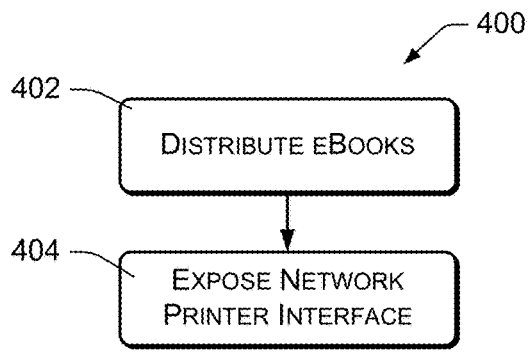
FIGS. 4 and 5 are flowcharts showing actions performed in the web-based service of FIG. 3.
Figure 5:
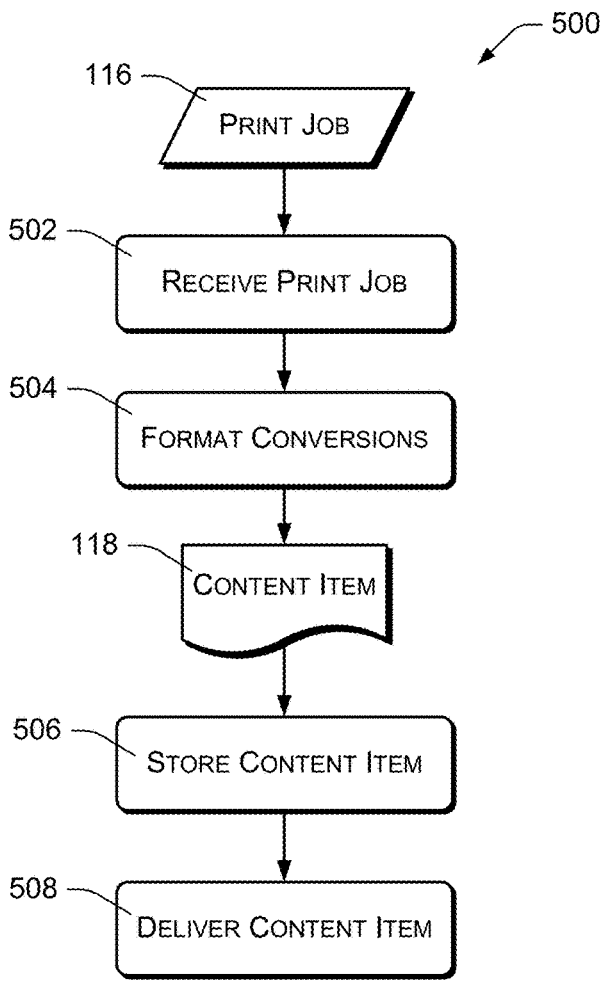

FIGS. 4 and 5 shows examples of processes that can be implemented by the content provider 302 to facilitate transferring content from a remote device such as the computer 104 to an eBook reader such as the eBook reader 106.

FIG. 4 shows preliminary actions 400 performed by the content provider 302. At 402, the content provider 302 distributes eBooks and/or other content items to a plurality of users, via electronic readers and/or reader devices that are associated with the users.

At 404, the content provider 302 exposes a network printer interface such as the network printer interface 210. The network printer interface 210 may be exposed at a particular network address, port, or URL (uniform resource locator). In some cases, the network printer interface may be exposed at a numeric IP (internet protocol) address, such as "192.168.1.15". In other cases, the network printer interface 210 may be exposed at a particular URL that corresponds to a numeric IP address, such as "alex.ebookprinter.com". Network ports and other addressing techniques may similarly be employed so that the network printer interface 210 is uniquely identifiable on the network 114.

The network printer interface 210 may be implemented using a standard network print communications protocol such as Internet Printer Protocol (IPP). A standard such as this supports access control, authentication, and encryption, allowing enhanced security when transferring documents over public networks. Other communication protocols may also be used.

The network printer interface 210 may also be implemented so that it emulates one or more popular and widely used printers. This allows it to be accessed by existing printer drivers that were originally designed for physical printers. Depending on the printer being emulated, print jobs may be in some type of raster format, in a vector format, in a textual format, or in some other format that may be proprietary to the emulated printer.

FIG. 5 shows actions 500 performed at the content provider 302 to facilitate printing to eBook readers from other devices. At 502, the network printer interface 210 communicates over a network, such as the Internet, to receive one or more print jobs 116 from one or more remote devices such as the computer 104. At 504, after receiving the print job 116, the content provider 302 makes any format conversions that may be appropriate. For example, the received print job 116 may represent content in an intermediate format, which may need to be converted to a different format that is compatible with the eBook reader 106. Note, however, that in some embodiments the print job may already represent content in an eBook compatible format, and format conversions 504 may therefore be unnecessary. In some cases, for example, the printer driver 206 of the computer 104 may convert the content to an eBook-compatible format prior to providing the print job to the network printer interface 210. Some typical eBook-compatible formats include PDF (portable document format), MOBI (referring to Mobipocket), TXT (referring to plain text files), and other open or proprietary formats.

At 506, the content item 118 may optionally be stored in a content provider repository such as the content repository 304. At 508, the content provider 302 delivers the content item to a user such as the user 102, for display on his or her associated eBook reader 106. In some systems, this may happen automatically as the user's eBook reader periodically connects to the content provider and checks for any updates or new content. In other cases, the user may specifically initiate an update sequence through some type of user interface provided by the user's eBook reader.

Figure 6:
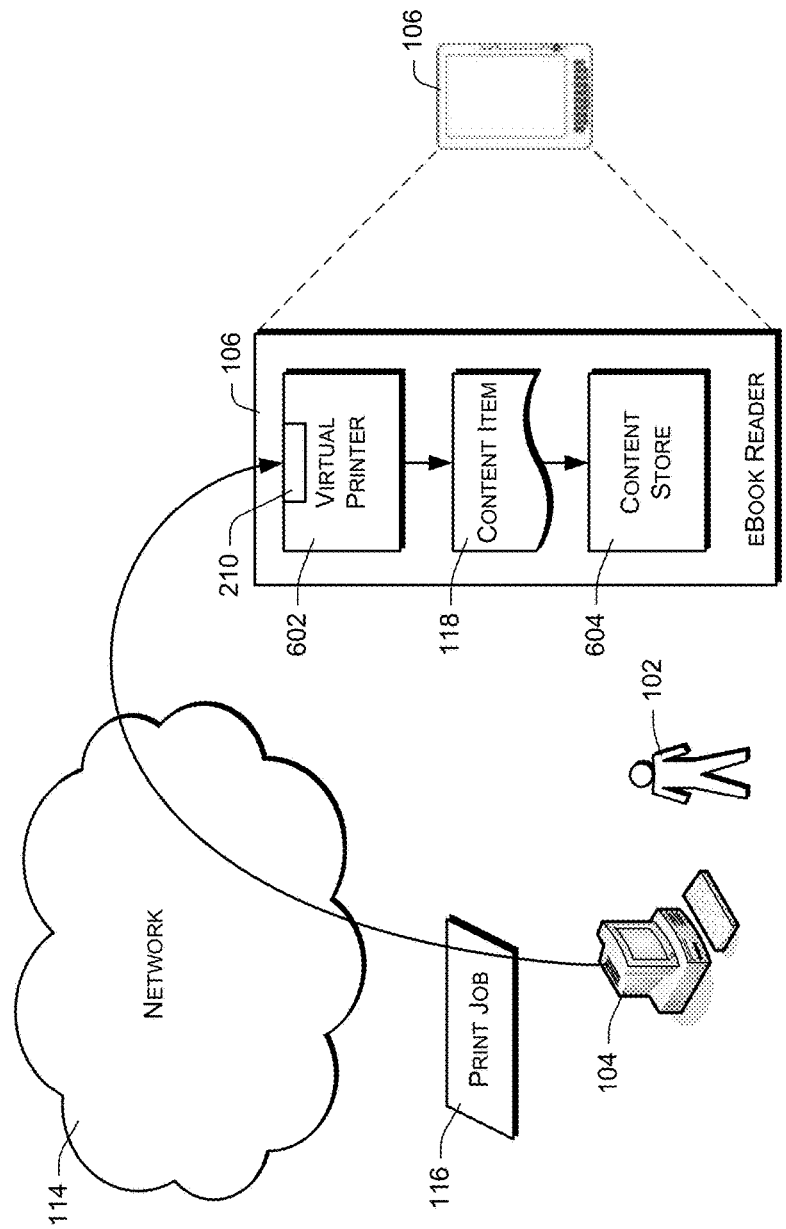
FIG. 6 is a diagram illustrating implementation of a virtual printer in an eBook reader for receiving print jobs from a computer.

FIG. 6 shows an implementation in which the network printer interface 210 is implemented by the eBook reader 106. In this example, the eBook reader 106 implements a virtual printer 602, which in turn exposes the network printer interface 210. The network printer interface 210 communicates using conventional network print protocols to receive the print job 116 from the computer 104, via the network 114. Upon receiving the print job 116, the virtual printer 502 performs any appropriate conversions to produce the content item 118, formatted as a normal content item that can be rendered by the eBook reader 106. The converted print job or content item 118 is then added to a content store 604 of the eBook reader 106, from which it can be accessed and rendered by the eBook reader 106.

Figure 7:
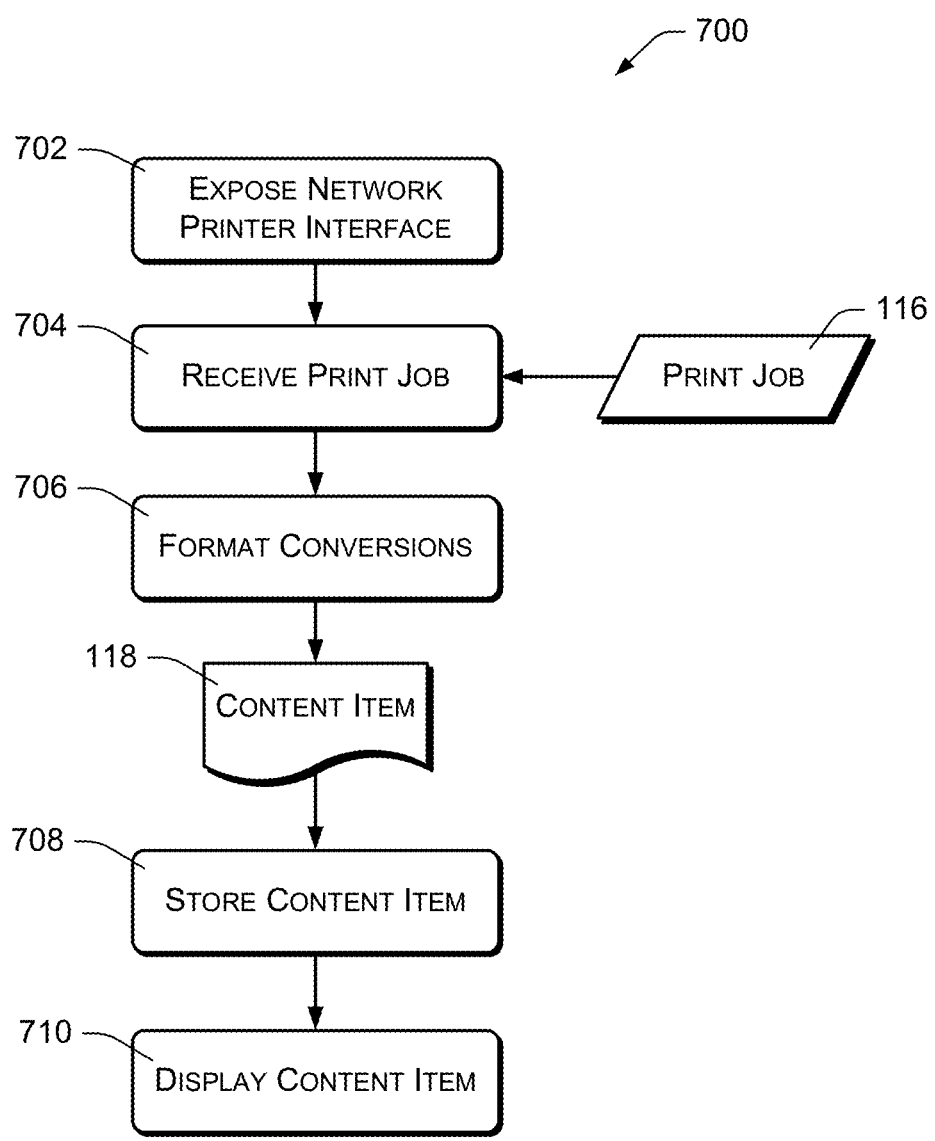
FIG. 7 is a flowchart showing actions performed in the reader-based implementation of FIG. 5

FIG. 7 shows an example of a process 700 that can be implemented by the eBook reader 106 to facilitate transferring content from a remote device such as the computer 104 to the eBook reader 106.

At 702, the eBook reader 106 exposes a network printer interface such as the network printer interface 210. As in the example of FIG. 3, the network printer interface 210 may be implemented using a standard network print communications protocol such as IPP. Other communication protocols may also be used. The network printer interface 210 may also be implemented so that it emulates one or more popular and widely used printers. Also as in the example of FIG. 3, the network printer interface 210 may be exposed at a particular network address, port, or URL.

At 704, the network printer interface 210 communicates over a network, such as the Internet, to receive one or more print jobs 116. At 706, after receiving the print job 116, the eBook reader 106 performs any conversions that might be appropriate to produce the content item 118. The conversions 706, which may be unnecessary in some embodiments, converts from the format of the print job 116 to the format used by the eBook reader 106 to store and/or render eBooks and other content items. At 708, the content item may then be stored in a local content store such as the content store 604.

At 710, the eBook reader 106 displays the content item for viewing by the user of the eBook reader. This may take place automatically, in response to receiving the print job 116, or upon specific request by the user.

Figure 8:
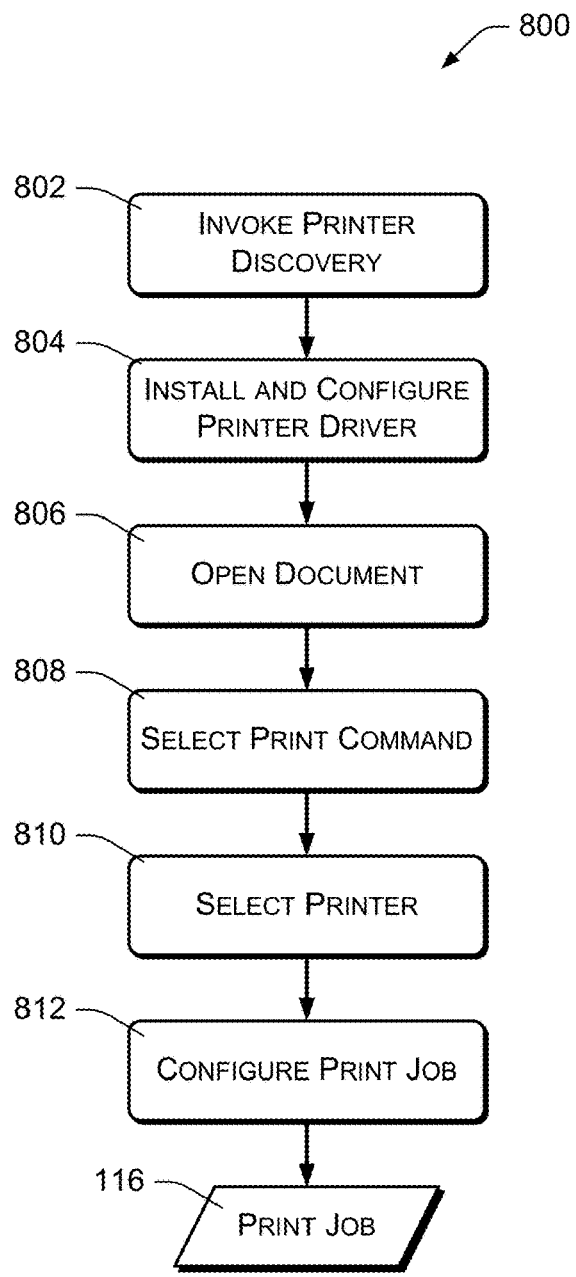
FIG. 8 is a flowchart showing actions performed at a computer to transfer content from the computer to an eBook reader.

FIG. 8 illustrates actions performed at a remote device such as a personal computer to transfer content to an eBook reader using the techniques described herein. At 802, a user may invoke a printer discovery component on the personal computer, which may scan devices and available networks to locate available printers. Depending on the specific environment, available printers may be able to make themselves visible to other network hosts and may be able to supply information about themselves.

At 804, a user installs and configures a printer driver. This may be initiated automatically in response to a user selecting a printer discovered in the previous action 802. Installation and configuration may be performed in different ways, depending on the nature of the user's computer and its operating system. In some embodiments, the printer driver may be a custom printer driver provided by the content provider 302 or by the manufacturer of the eBook reader 106, designed especially for compatibility with the content provider and/or the eBook reader. In other embodiments, a generic printer driver may be used, such as a printer driver that is widely available and perhaps designed for an actual printer. In some embodiments, where the network printer interface 210 is designed to emulate a well known or widely used printer, the printer driver may be one that is preinstalled on a user's computer, or one that has already been provided by the computer manufacturer or as part of the computer's operating system. In other embodiments, the user may download a compatible printer driver from a web site, or directly from the content provider 302.

In some cases, configuring the printer driver may include specifying the network printer interface 210 as its destination. More specifically, this may involve specifying the network address of the network printer interface 210. The network address may be specified as a numeric IP address or as a URL such as "alex.ebookprinter.com". Other methods of network identification may also be used in various embodiments. Furthermore, the discovery process discussed with reference to action 802 may automatically supply the destination parameters.

At 806, the user opens or accesses a document that is to be transferred to the eBook reader 106. The document may be already present on the user's computer or may be accessible by the user's computer, such as being on a networked drive or some type of remote or removable storage. In some cases, the user may open the document using a computer application such as an editor or editing program. Word processors, text editors, graphics creation programs, and photo editors are examples of editing programs. Documents may also be opened by viewing programs, such as by an Internet browsing program. The user may interact with various other types of programs that may also act as print sources.

At 808, the user selects a print action or command. This may involve navigating through a menu structure, or selecting an on-screen icon. In response to selecting a print action, the user may be prompted at 810 to select a destination printer. In many cases, several printer drivers will be installed on the user's computer. In response, the user may select a print driver that has been configured to send print jobs to the content provider 302 or directly to the eBook reader device 106.

At 812, the user may be asked to configure the print job. For example, the user may be prompted for specific characteristics of the eBook reader to which the document will be supplied, such as display size, whether it supports color display, etc. In addition, the user may be asked to supply preferences such as font size, page orientation, and so forth.

The computer then uses the printer driver to transmit and deliver the print job 116 to the content provider 302 or to the eBook reader device 106. The print job 116 may define printable or displayable images in various different ways, depending on the particular implementation. For example, images may be formatted in accordance with those commonly used in electronic book reader devices. Alternatively, the printer driver may define images in an intermediate format such as PS (PostScript), PDF (Portable Document Format), or some type of raster format.

Figure 9:
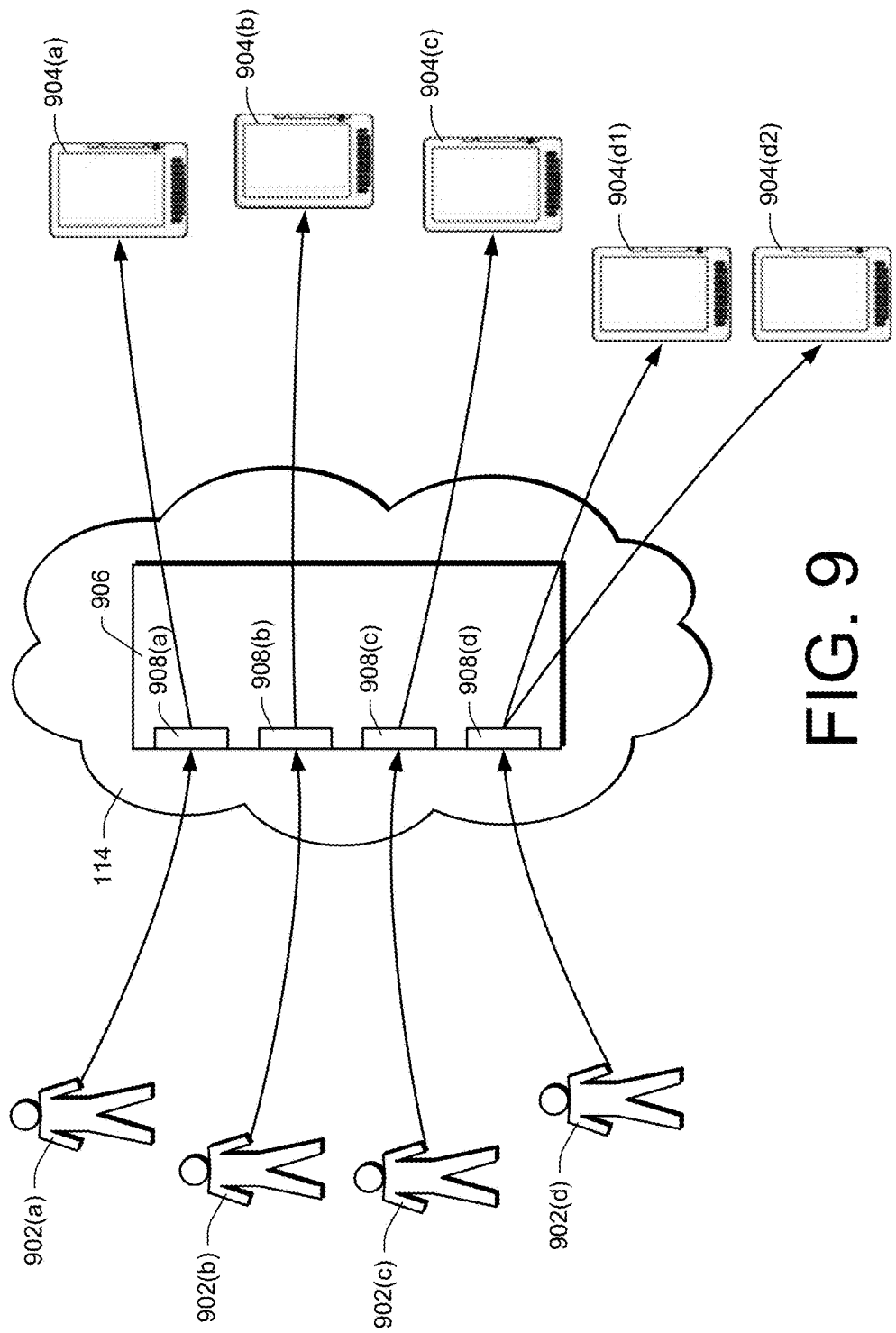
FIG. 9 is a diagram showing a web-based service that accepts print jobs from multiple users and that distributes the print jobs as content items to corresponding eBook readers.

FIG. 9 illustrates how a network-based or web-based technique such as described above with reference to FIG. 3 can be used in such a way as to allow multiple users to transfer content from their computers or other devices to their eBook readers. FIG. 9 shows a plurality of users 902(a), 902(b), 902(c), and 902(d) (referred to collectively as users 902) who are associated with respective eBook readers 904(a), 904(b), 904(c), and 904(d1 and d2) (collectively referred to as eBook readers 904). More specifically, user 902(a) is the owner of eBook reader 904(a), user 902(b) is the owner of eBook reader 904(b), user 902(c) is the owner of eBook reader 904(c), and user 902(d) is the owner of eBook readers 904(d1) and 904(d2).

A content provider 906 or other network-based or web-based service exposes and maintains a plurality of network printer interfaces 908(a), 908(b), 908(c), and 908(d) (collectively referred to as network printer interfaces 908). Each network printer interface 908 is associated with one of the users 902 and with one or more of the eBook readers 904. Any particular network printer interface 908 receives print jobs from a corresponding user 902, converts the print jobs, and makes them available to the corresponding eBook reader(s) 904.

Note that the user 902(d) owns two eBook readers 904 (d1) and 904(d2), and that printing to the network printer interface 908(d) enables the user to transfer content to both of his or her eBook readers.

The network printer interfaces 908 may each be uniquely addressable by means of different IP addresses, port numbers, or URLs. For example, the network printer interface 908(a) may be addressable by the URL "alex.ebookprinter.com" while the network printer interface 908(b) is addressable by the URL "mary.ebookprinter.com".

Figure 10:
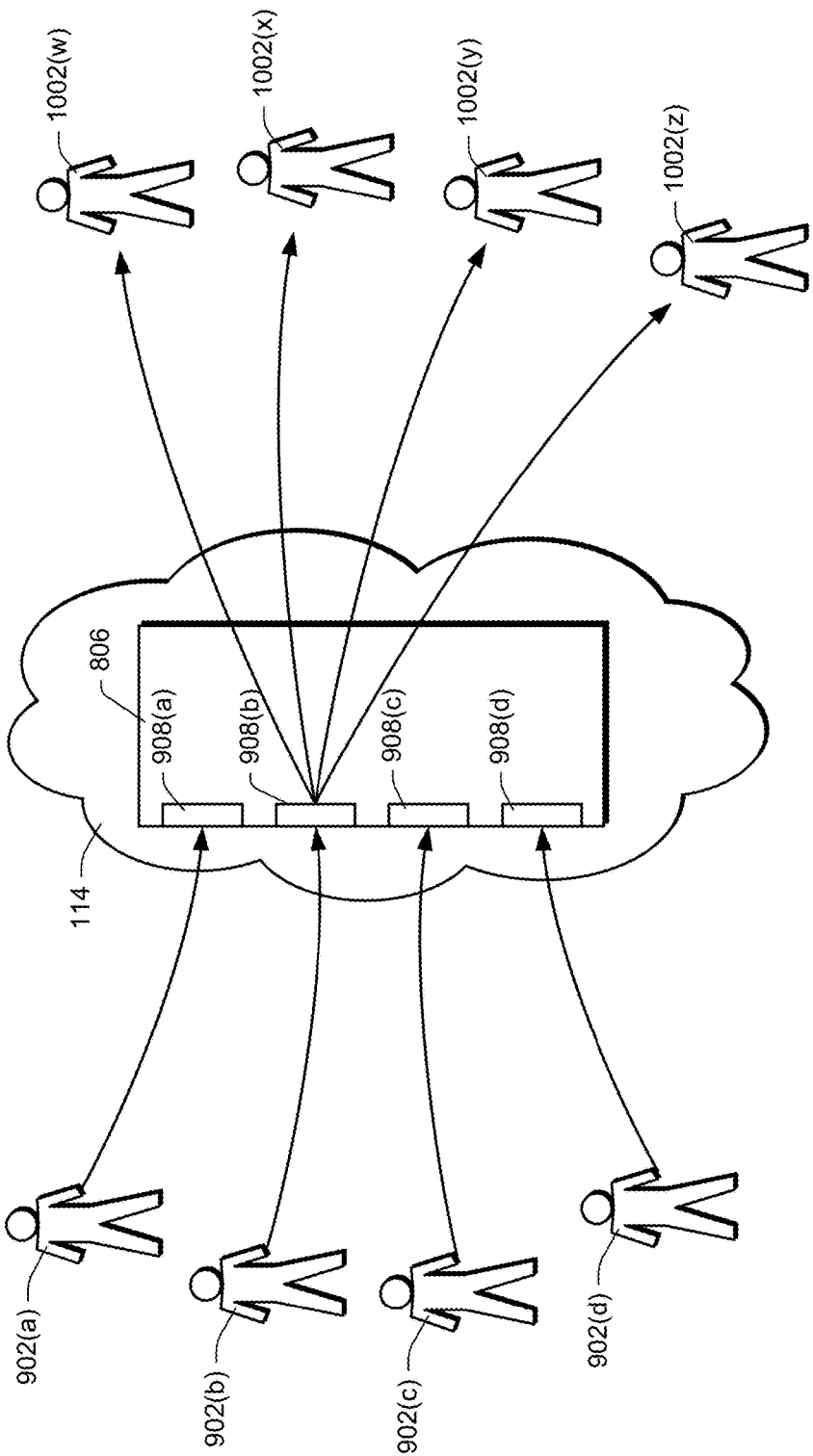
FIG. 10 is a diagram showing a web-based service that accepts print jobs from contributing users and that allows multiple subscribed recipient users to receive the print jobs as content items.

FIG. 10 illustrates another way of using the techniques described above. In this embodiment, which may be implemented as an extension of the embodiment shown in FIG. 9, various different recipient users can subscribe to receive content from a particular contributing user. In this example, the users 902 are considered to be contributing users. Also shown is a group or other plurality of recipient users 1002(w), 1002(x), 1002(y) and 1002(z) (referred to collectively as recipient users 1002). Each of the recipient users 1002 has subscribed to receive content published by the individual contributing user 902(b). Whenever the contributing user 902(b) prints content to the network printer interface 908(b), the content is distributed as a content item to each of the subscribing users 1002.

Figure 11:
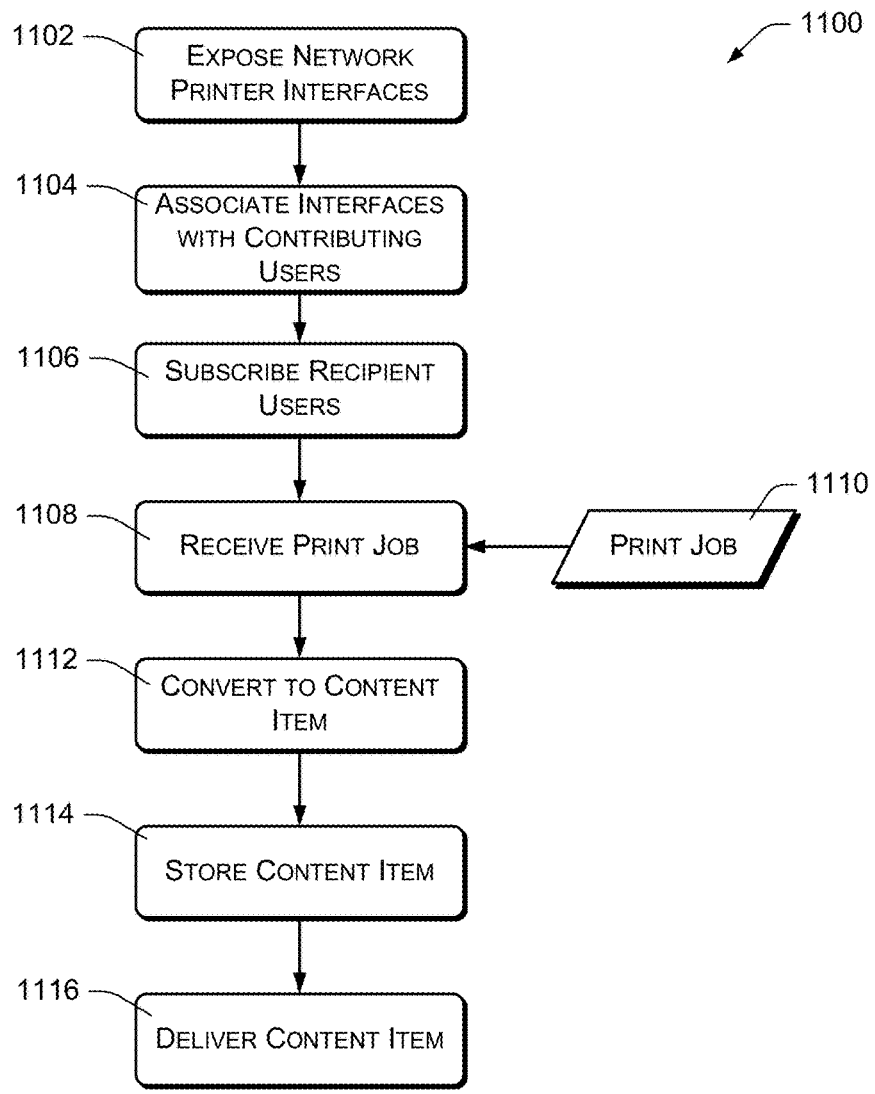
FIG. 11 is a flowchart showing actions performed by the web-based service of FIG. 10.

FIG. 11 illustrates the concepts of FIG. 10 in methodological terms. At 1102, the content provider 806 exposes a plurality of network printer interfaces. As described above, the network printer interfaces can be differentiated by having unique network addresses or URLs. At 1104, a contributing user is associated respectively with an individual network printer interface 908. It is assumed that each contributing user has configured a printer driver with the contributing user's network printer interface 908 as its destination.

At 1106, the content provider 906 subscribes a plurality of recipient users to receive printed content from the contributing user. This may be in response to the recipient users requesting to be subscribed to content printed by the contributing user.

At 1108, the content provider 906 receives a print job 1110 from the contributing user, to which the recipient users have been subscribed. At 1112, the content provider 906 converts the print job to an eBook-compatible format. At 1114, the content provider 906 stores the converted print job as a new content item, for eventual distribution to the recipient users. At 1116, the content provider 906 delivers the new content item to each of the subscribed recipient users.

As mentioned above, the eBook reader 106 may comprise a wide variety of electronic devices, such as smartphones, personal digital assistants (PDAs), portable media players, desktop computers, portable computers, tablet computers, dedicated-purpose eBook reader devices, and so forth. In the described embodiments, these devices have wired or wireless network connectivity, allowing them to remotely access and retrieve electronic content from online sources such as electronic book sellers and websites.

For purposes of discussion, the terms "electronic content," "electronic document," "electronic book," and/or "eBook," as used herein, include electronic or digital representations of printed works, as well as digital content that may include text, multimedia, hypertext, and/or hypermedia. Examples of printed and/or digital works include, but are not limited to, books, magazines, newspapers, scholarly works and papers, journals, reference materials, telephone books, textbooks, anthologies, instruction manuals, proceedings of meetings, forms, directories, maps, web pages, etc. Accordingly, the terms "electronic document," "electronic book," and "eBook" may include any content that is in electronic or digital format.

Figure 12:
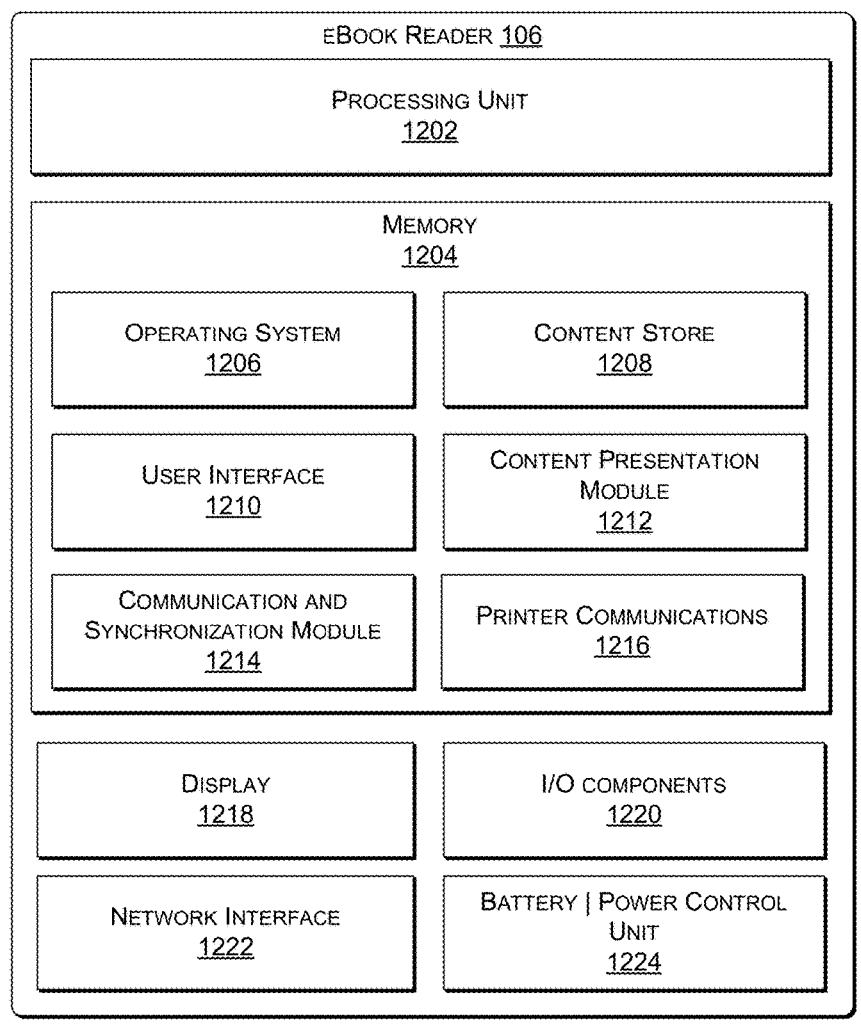
FIG. 12 is a block diagram showing relevant components of an eBook reader that may be configured to perform various functions described herein.

FIG. 12 is a high-level block diagram showing an example of the eBook reader 106, indicating components that are relevant to this discussion. In this embodiment, the eBook reader 106 is a dedicated eBook reader device, designed specifically for the purpose of emulating a traditional book-like reading experience. To that end, it is has a size and weight that is comparable to a paper-based book, and uses a monochrome display having a contrast ratio that approaches that of the printed page.

In a very basic configuration, the eBook reader 106 includes a processing unit 1202 composed of one or more processors, and memory 1204. Depending on the configuration of the eBook reader 106, the memory 1204 may be a type of computer storage media and may include volatile and nonvolatile memory. Thus, the memory 1204 may include, but is not limited to, RAM, ROM, EEPROM, flash memory, or other memory technology, or any other medium which can be used to store media items or applications and data which can be accessed by the eBook reader 106.

The memory 1204 may be used to store any number of functional components that are executable on the processing unit 1202. In many embodiments, these functional components comprise instructions or programs that are executable by the processing unit 1202, and that implement operational logic for performing the actions attributed above to the eBook reader 106. In addition, the memory 1204 may store various types of data that are referenced by executable programs.

The memory 1204 may store an operating system 1206 and a content store 1208 to store one or more content items, including content items that have been created from received print jobs. A user interface module 1210 may also be provided in the memory 1204 and executed on the processing unit 1202 to provide for user operation of the eBook reader 106. The UI module 1210 may provide menus and other navigational tools to facilitate selection and rendering of content items. The UI module 1210 may further include a browser or other application that facilitates access to sites over a network, such as websites or online merchants, or other sources of electronic content items or other products.

The UI module 1210 may utilize a content presentation module or application 1212 that renders the content items. The content presentation module may be implemented as various applications depending upon the content items. For instance, the content presentation module may be an electronic book reader application for rending electronic books, or an audio player for playing audio books, or a video player for playing video, and so forth.

A communication and synchronization module 1214 is stored in the memory 1204 and executed on the processing unit 1202 to perform management functions in conjunction with one or more content sources, such as the content provider 302 discussed above. In some embodiments, the communication and synchronization module 1214 communicates with the content provider 302 to receive eBooks and other content.

The memory 1204 may also store printer communications logic 1216, which may comprise a network printer interface configured to represent the electronic reader 106 as a network-accessible printer on a network, and to receive print jobs via a network. The printer communications logic 1216 may include logic for converting print jobs to content items, to be stored within the content store 1208.

The eBook reader 106 may further include a display 1218 upon which electronic books are rendered. As described above, the eBook reader 106 may also be configured to display received print jobs as content items on the display 1218.

In one implementation, the display 1218 uses electronic paper display technology. In general, an electronic paper display is one that has a high resolution (150 dpi or better) and is bi-stable, meaning that it is capable of holding text or other rendered images even when very little or no power is supplied to the display. The electronic paper display technology may also exhibit high contrast substantially equal to that of print on paper. Some exemplary electronic paper displays that may be used with the implementations described herein include bi-stable LCDs, MEMS, cholesteric, pigmented electrophoretic, and others. One exemplary electronic paper display that may be used is an E Ink-brand display. Touch sensitive technology may be overlaid or integrated with the electronic paper display technology to enable user input via contact or proximity to the screen.

The eBook reader 106 may further be equipped with various input/output (I/O) components 1220. Such components may include various user interface controls (e.g., buttons, joystick, keyboard, etc.), audio speaker, connection ports, and so forth.

A network interface 1222 supports both wired and wireless connection to various networks, such as cellular networks, radio, WiFi networks, short range networks (e.g., Bluetooth), IR, and so forth. The network interface 1222 facilitates receiving electronic books and other content as discussed herein. Of particular note, the network interface 1222 enables wireless delivery of print jobs and/or content items.

The eBook reader 106 may also include a battery and power control unit 1224. The power control unit operatively controls an amount of power, or electrical energy, consumed by the eBook reader device. Actively controlling the amount of power consumed by the reader device may achieve more efficient use of electrical energy stored by the battery.

The eBook reader 106 may have additional features or functionality. For example, the eBook reader device 106 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Figure 13:
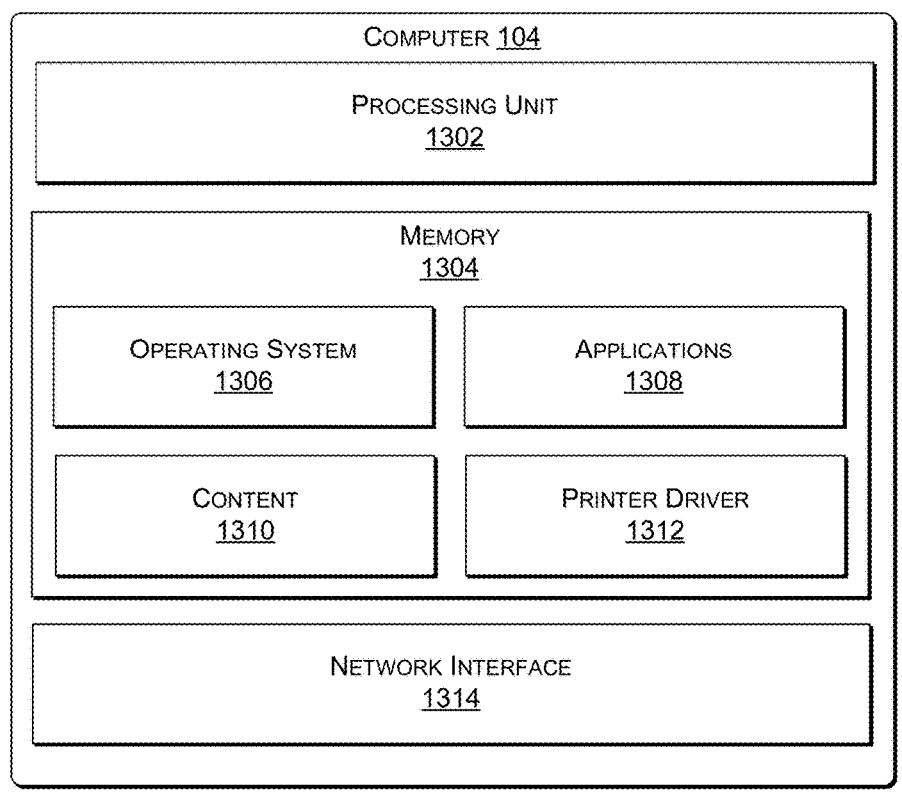
FIG. 13 is a block diagram showing relevant components of a computer that may be configured to perform various functions described herein.

FIG. 13 illustrates relevant components of the computer 104. Note that although the computer 104 is illustrated and described as a desktop personal computer, many other types of devices might also act as print sources, including computers having different form factors, various portable devices, media servers, and other networked special-function devices.

The computer 104 may include a processing unit 1302 composed of one or more processors, and memory 1304. Depending on the configuration of the computer 104, the memory 1304 may be a type of computer storage media and may include volatile and nonvolatile memory. Thus, the memory 1304 may include, but is not limited to, RAM, ROM, EEPROM, flash memory, or other memory technology.

The memory 1304 may be used to store any number of functional components that are executable by the processing unit 1302. In many embodiments, these functional components comprise instructions or programs that are executable by the processing unit 1302, and that when executed implement operational logic for performing the actions attributed above to the computer 104. In addition, the memory 1304 may store various types of data that are referenced by executable programs.

Functional components stored in the memory 1304 may include an operating system 1306 and one or more applications 1308. The applications 1308 may include applications that are installed by a user. Examples of the applications 1308 include text editors, word processors, graphics viewers and editors, content and internet browsers, and so forth.

Content 1310 may also be stored in the memory 1304, to be accessed by one or more of the applications 1308. The content may comprise files or other data containing information upon which printable images can be based, including text files, graphics files, word processing documents, and so forth.

In accordance with the techniques described above, the memory 1304 may also include a printer driver 1312 that operates in conjunction with the operating system 1306 to print content at the request of applications 1308. The printer drive 1312 can be configured to access and provide print jobs to a network-based printer, or to a service or device that emulates a network-based printer—such as the content provider 302 or the eBook reader 106.

The computer 104 also has a network interface 1314, for communications with the content provider 302 and/or the eBook reader 106.

Figure 14:
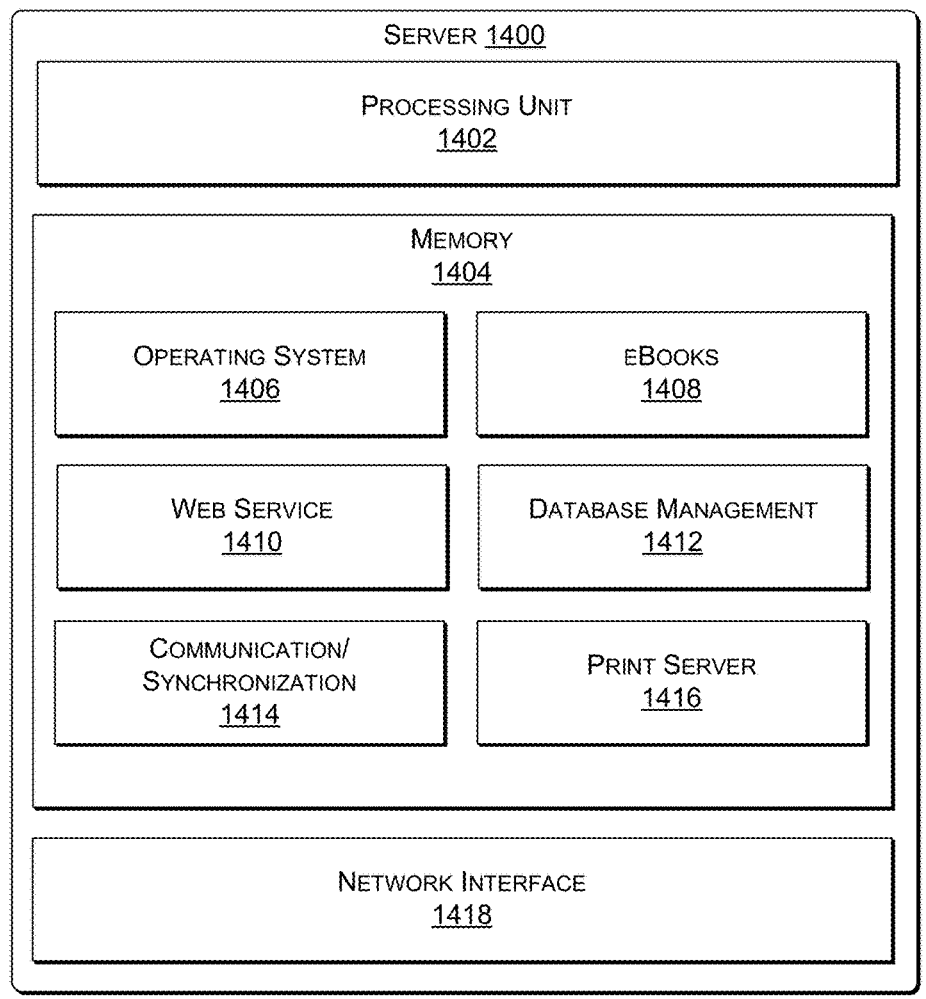
FIG. 14 is a block diagram showing relevant components of a server that may be configured to perform various functions described herein.

FIG. 14 illustrates relevant components of a server 1400 that may be used to implement the functionality of the content provider 302. Generally, the content provider 302 may be implemented by one or more servers, with the various functionality described above distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises.

In a very basic configuration, an example server 1400 comprises a processing unit 1402 composed one of one or more processors, and memory 1404. The memory 1404 may be a type of computer storage media and may include volatile and nonvolatile memory. Thus, the memory 1404 may include, but is not limited to, RAM, ROM, EEPROM, flash memory, or other memory technology, or any other medium which can be used to store media items or applications and data which can be accessed by the server 1400.

The memory 1404 may be used to store any number of functional components that are executable on the processing unit 1402, as well as data and content items that are supplied to consuming devices such as the eBook reader 106. Thus, the memory 1404 may store an operating system 1406 and an eBook storage database to store one or more content items, such as eBooks 1408.

Functional components of the server 1400 may also comprise a web service component 1410 that interacts with remote devices such as computers and media consumption devices.

The server 1400 may also include various database management components 1412 for keeping track of users, purchases, etc. The server 1400 may also include a communication and synchronization module 1414 to communicate with remote consumption devices and to communicate any purchased electronic content to those devices.

The server 1400 may include one or more print server modules 1416 that are configured to perform the processes described above with FIGS. 5 and 11.

A network interface 1418 may also be provided by the server 1402 to communicate with various client devices, including the computer 104 and the eBook reader 106.

The server 1402 may of course include many other logical, programmatic, and physical components, of which those shown in FIG. 14 are merely examples that are related to the discussion herein.

Note that the various techniques described above are assumed in the given examples to be implemented in the general context of computer-executable instructions or software, such as program modules, executed by one or more computers or other devices. Generally, program modules include routines, programs, objects, components, data structures, etc. for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A method of content distribution, comprising:
   exposing a first network printer interface at a content service;
   associating the first network printer interface with a first subset of a plurality of electronic book reader devices that are associated with the content service, the first subset of the plurality of electronic reader book devices including less than all of the plurality of electronic book reader devices;
   communicating with a first remote device through the first network printer interface using a printer communications protocol;

receiving a first print job at the content service through the first network printer interface from the first remote device;

converting the first print job into a first converted file that is displayable via the first subset of the plurality of electronic reader book devices;

storing the first converted file at a content repository of the content service;

making the first converted file available for download by the first subset of the plurality of electronic book reader devices associated with the first network printer interface based at least in part on the first network printer interface being associated with the first subset of the plurality of electronic book reader devices;

exposing a second network printer interface at the content service;

associating the second network printer interface with a second subset of the plurality of electronic book reader devices;

communicating with a second remote device through the second network printer interface;

receiving a second print job at the content repository of the content service;

converting the second print job into a second converted file; and making the second converted file available for download by the second subset of the plurality of electronic book reader devices.

2. The method of claim 1, wherein the first remote device is configured with a printer driver that specifies the first network printer interface as a print destination.

3. The method of claim 1, further comprising:
subscribing the first subset of the plurality of electronic book reader devices to receive content from a particular user; and
associating the first network printer interface to the first subset of the plurality of electronic book reader devices based on the subscribing.

4. The method of claim 1, wherein the content service provides electronic books, and wherein:
the method further comprises converting the first print job into a particular electronic book, and
the making the first converted file available for download includes making the particular electronic book available for download.

5. The method of claim 1, wherein the content service provides content in an electronic book compatible format, and wherein the first print job is received by the content service in the electronic book compatible format.

6. A method of content distribution, comprising:
exposing a first network printer interface at a content service;
associating the first network printer interface with a first subset of a plurality of electronic readers that are associated with the content service;
receiving, from a first remote computer, a first print job at the content service through the first network printer interface;
determining that the first subset of the plurality of electronic readers are associated with the first network printer interface;
converting the first print job into a first converted file that is displayable via the first subset of the plurality of electronic readers;
making the first converted file available for download from the content service to the first subset of the plurality of electronic readers based at least in part on the first network printer interface being associated with the first subset of the plurality of electronic readers;
exposing a second network printer interface at the content service;
associating the second network printer interface with a second subset of the plurality of electronic readers that are associated with the content service;
receiving, from a second remote computer, a second print job at the content service through the second network printer interface;
converting the second print job into a second converted file that is displayable via the second subset of the plurality of electronic readers;
determining that the second subset of the plurality of electronic readers are associated with the second network printer interface; and
making the second converted file available for download from the content service to the second subset of the plurality of electronic readers based at least in part on the second network printer interface being associated with the second subset of the plurality of electronic readers.

7. The method of claim 6, wherein the first converted file is made available for download to the first subset of the plurality of electronic readers as content items in a content repository.

8. The method of claim 6, further comprising receiving the first print job from a printer driver installed on the remote computer, the printer driver specifying the first network printer interface as a print destination.

9. The method of claim 6, further comprising:
subscribing a group of users to receive content from a particular user; and
associating, based on the subscribing, the first subset of the plurality of electronic readers to the first network printer interface.

10. The method of claim 6, wherein the first network printer interface is exposed at an Internet uniform resource locator (URL).

11. The method of claim 6, further comprising communicating over a network using a printer communication protocol to receive the first print job.

12. The method of claim 6, wherein the content service provides electronic books, and wherein:
the method further comprises converting the first print job into a particular electronic book, and
the making the first converted file available for download includes making the particular electronic book available for download.

13. The method of claim 6, wherein the content service provides content in an electronic book compatible format, and wherein the first print job is received by the content service in the electronic book compatible format.

14. A method of content distribution, comprising:
exposing a first remote device to a first network printer interface of a content distribution service;
associating the first network printer interface with a first subset of a plurality of electronic book reader devices associated with the content distribution service;
receiving from the first remote device a first print job at the first network printer interface;
converting the first print job to a first converted file that is compatible with the first subset of the plurality of electronic book reader devices;

distributing the first converted file to the first subset of the plurality of electronic book reader devices based at least in part on the first network printer interface being associated with the first subset of the plurality of electronic book reader devices;

exposing a second remote device to a second network printer interface;

associating the second network printer interface with a second subset of the plurality of electronic book reader devices;

receiving from the second remote device a second print job at the second network printer interface;

converting the second print job to a second converted file that is compatible with the second subset of the plurality of electronic book reader devices; and distributing the second converted file to the second subset of the plurality of electronic book reader devices based at least in part on the second network printer interface being associated with the second subset of the plurality of electronic book reader devices.

15. The method of claim 14, further comprising creating a new content item from the first print job.

16. The method of claim 14, further comprising:

subscribing a user to receive content from a particular user associated with the remote device;

associating a particular electronic book reader device of the plurality of electronic book reader devices with the first network printer interface based at least on the subscribing; and delivering the first converted file to the particular electronic book reader device based at least on the particular electronic book reader device being associated with the first network printer interface.

17. The method of claim 14, wherein the first network printer interface is exposed at an Internet port of the content distribution service.

18. The method of claim 14, wherein the first network printer interface is exposed at an Internet uniform resource locator (URL) of the content distribution service.

19. The method of claim 14, further comprising communicating with the remote device using a printer communication protocol to receive the print job.

* * * * *